Patented Aug. 21, 1923.

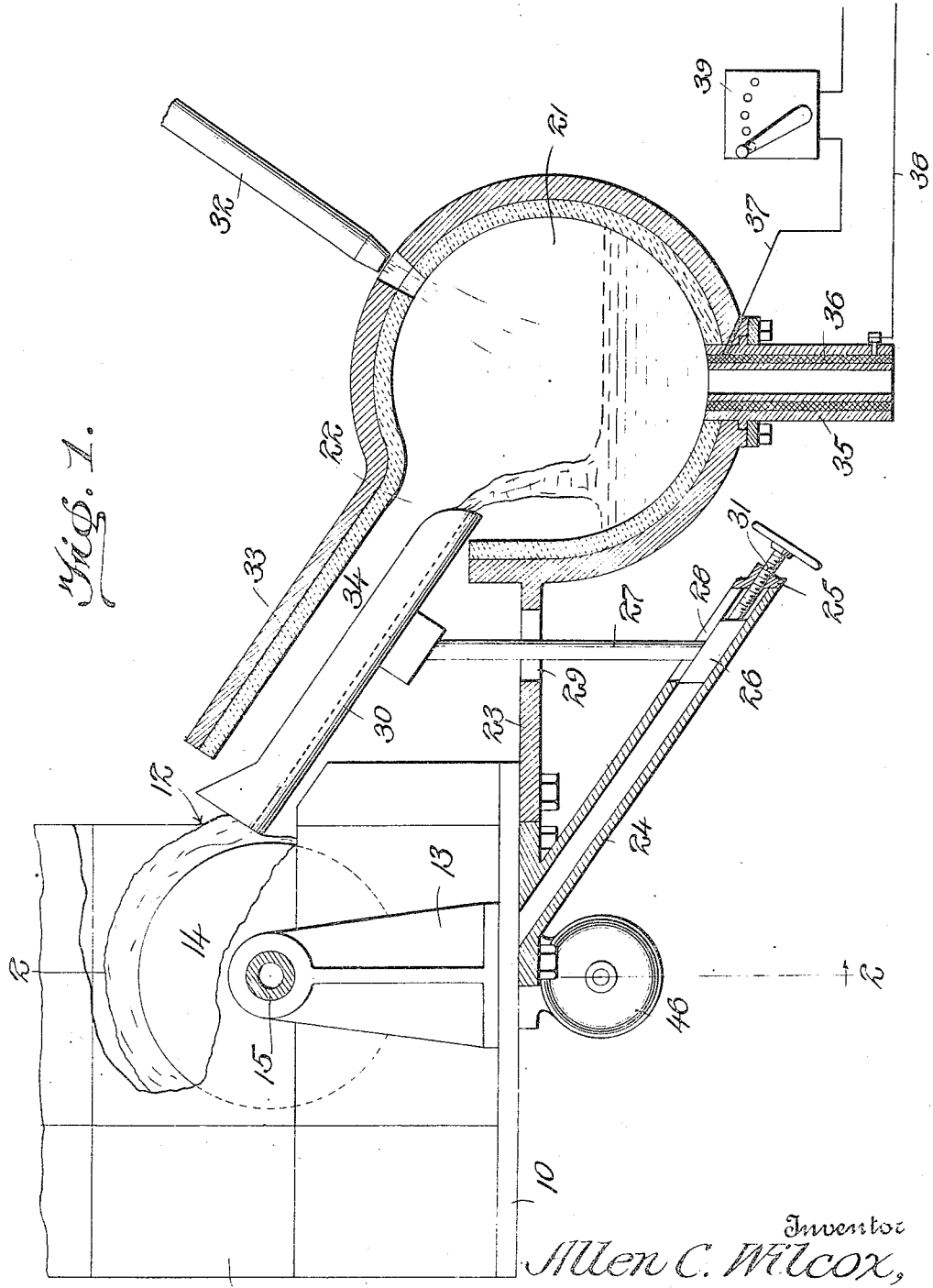

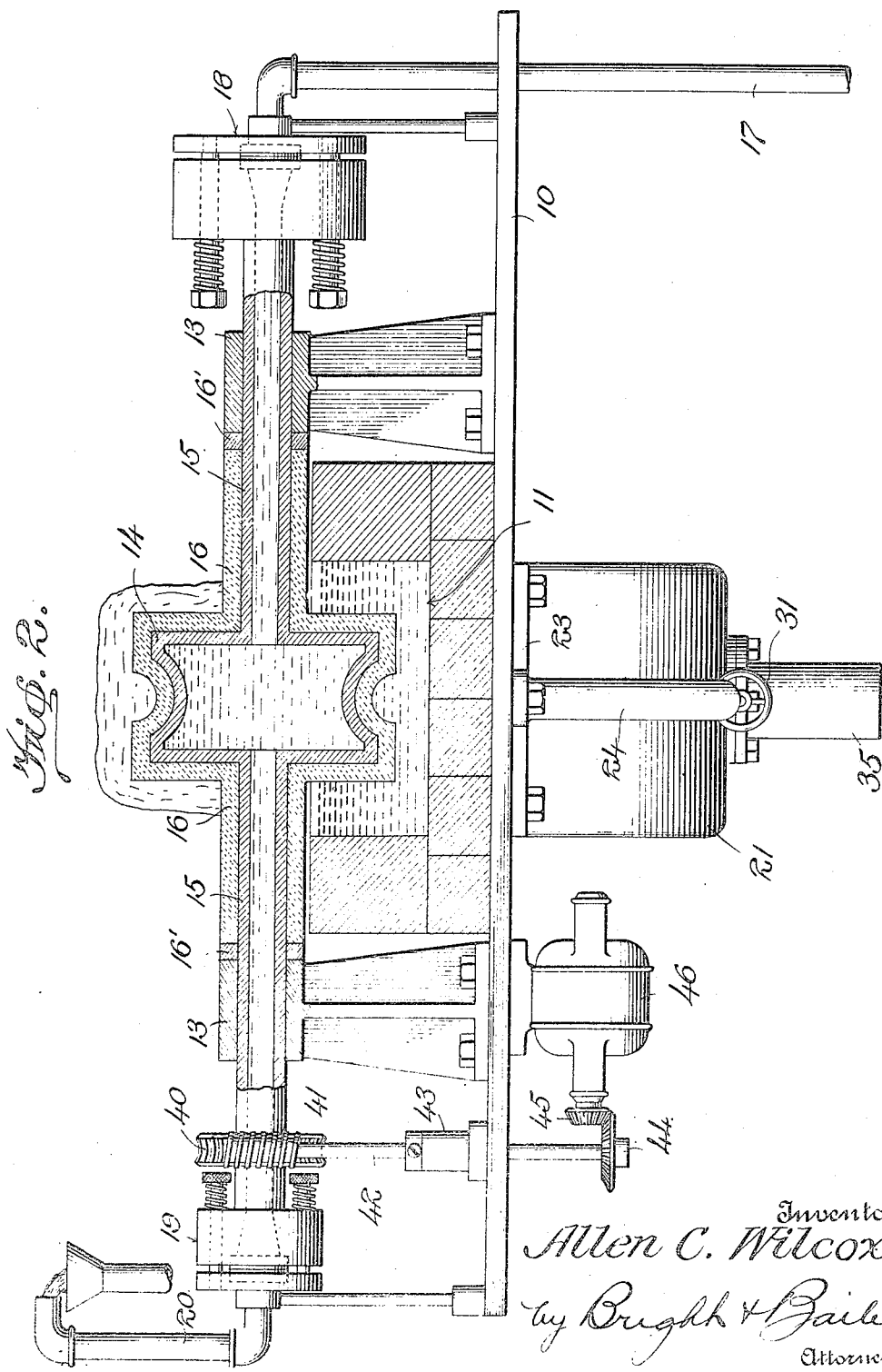

1,465,886

UNITED STATES PATENT OFFICE.

ALLEN CHARLES WILCOX, OF BRIDGEPORT, OHIO.

GATHERING AND DELIVERING APPARATUS FOR MOLTEN GLASS.

Application filed July 8, 1921, Serial No. 483,336. Renewed June 27, 1923.

*To all whom it may concern:*

Be it known that I, ALLEN CHARLES WILCOX, a citizen of the United States, and resident of Bridgeport, in the county of Belmont and State of Ohio, have invented certain new and useful Improvements in Gathering and Delivering Apparatus for Molten Glass, of which the following is a specification.

My invention relates to gathering and delivering apparatus for molten glass.

It is the purpose of my present invention to provide an apparatus of this type which will assure the gathering and delivery of glass at a desired temperature free from impurities, which will protect against injury those elements exposed to excessive heat, which will avoid excessive loss of molten glass in the event of accident, and which will permit the use of the method and structure for electrically controlling the delivery of glass to a glass working apparatus such as are described in my copending application serially numbered 449,285.

To this end my invention consists in the details of construction and in the arrangement and combination of parts to be hereinafter more fully described and particularly pointed out in the appended claims.

In describing my invention in detail reference will be had to the accompanying drawing wherein like characters of reference denote corresponding parts in the several views, and in which Fig. 1 is a vertical section through my improved apparatus; and Fig. 2, a section on the line 2—2 of Fig. 1.

Referring to the drawings my improved apparatus is shown as comprising a supporting member 10 adapted to rest upon any suitable foundation (not shown). I erect upon the central portion of the member 10 a main glass tank 11 having a mouth 12. Mounted on the member 10 on opposite sides of the tank respectively are bearings 13 for a purpose that will presently appear. Disposed within the tank 11 is a hollow gathering disk 14 having hollow trunnions 15 the bores of which communicate with the interior of the disk. These trunnions extend through openings in opposite side walls of the main tank and are rotatably suported by the bearings 13. The entire disk 14 and the trunnions 15 between the disk and bearings are covered with a refractory material 16 to protect these elements against injury from excessive heat, while the bearings 13 are so protected by heat pads 16'. The disk 14 is of such diameter as to extend to a good depth into the molten glass carried by the tank to thereby assure the gathering of molten glass which is at the highest temperature and which is free from impurities. The trunnions 15 are extended outwardly of respective bearings 13 and a water inlet 17 is connected with the bore of one of them by a suitable union 18, while the bore of the other trunnion is connected by means of a suitable union 19 with an outlet pipe 20 which is directed upwardly and discharges at a point above the extreme upper portion of the chamber within the disk 14 which assures the chamber of the disk being fully charged with cooling water during such time as the latter is being supplied from the inlet 17. By this construction it v,ll be obvious that I have supplied an effective means for cooling both disk and trunnions and thereby prevent any injury to these parts as a result of excessive heat.

Disposed forward of the tank 11 and slightly lower than the latter is a relatively small auxiliary tank 21 of substantially cylindrical shape with its longitudinal axis disposed parallel to the axis of rotation of the disk 14. I provide this tank with a mouth 22 and support the same from the member 10 by an arm 23 projecting from the body of the auxiliary tank.

Supported from the under side of the member 10 is a downwardly inclined guideway 24 having a closed lower end 25. Slidable in this guideway is a base 26 of a standard 27 which latter projects through elongated slots 28 and 29 in the guideway and arm 23 respectively whereby said standard may be moved toward and away from the tank 11. Fixed to the upper end of the standard 27 is an inclined trough 30 parallel to the guide-way 24 which constitutes the means for transferring molten glass from the main tank 11 to the auxiliary tank 21, the upper end of said trough being adapted to collect glass from the gathering disk 14 while its lower end is positioned to deliver the glass so collected to the auxiliary tank. Adjustment of the standard 27 and of course the trough 30 is effected by means of a screw 31 associated with the base 26 and threaded in the end 25 of the guideway 26. By adjusting the position of the trough 30 as explained it will be obvious that the quantity of glass collected from the disk 14 can be varied while sufficient adjustment of the trough to the right in Fig. 2 will entirely stop the delivery of glass from the main tank to the auxiliary tank by removing the upper end of the trough from the range of the glass gathered on the disk 14. I heat the interior of the auxiliary tank by means of a burner 32 and provide said tank with an extension or lip 33 above and parallel to the trough 30, said extension forming in conjunction with the trough a flue 34 through which the hot gases from the auxiliary tank pass to maintain the glass flowing through the trough warm.

Molten glass is delivered from the auxiliary tank 21 to a desired glass working apparatus and such delivery is controlled by the method and means described and claimed in my copending application No. 449,285. To this end I detachably secure a nozzle 35 in an opening in the bottom of the tank 21. This nozzle is shown with a cylindrical bore through which the molten glass is adapted to flow under the influence of gravity. An electrical heating element 36 is incorporated in the nozzle 35 and is connected by conductors 37 and 38 with a suitable source of electrical energy. A rheostat 39 is incorporated in the conductor 37 through the instrumentality of which the degree of heat radiated from the element 36 may be controlled. By raising and lowering the degree of heat radiated from the element 36 the rapidity of delivery of glass from the nozzle will be correspondingly increased and decreased as set forth and claimed in my copending application. It will be noted that by employing an auxiliary tank a very small amount of molten glass will be lost in the event of stoppage, from accident or other causes, of the glass working apparatus being supplied.

To rotate the disk 14 I fixedly mount on one trunnion 15 between the union 19 and the adjacent bearing 13 a worm wheel 40 with which meshes a worm 41 fixed on a vertical shaft 42. This shaft is rotatably mounted in a bearing 43 on the member 10. Fixed on the lower end of this shaft is a bevel gear 44 with which meshes a bevel gear 45 fixed on the shaft of an electric motor 46 said motor being supported from the under side of the member 10. It will be obvious that upon actuation of the motor 46 the desired rotation of the gathering disk 14 will be effected through the various connections just described.

While I have described one particular form of carrying my invention into practice it will be apparent that the same is susceptible to various changes in forms and proportions and to desirable additions with the exercise of only ordinary mechanical skill and without departing from the scope of the invention as set forth in the appended claims.

I claim:—

1. In apparatus for gathering and delivering molten glass, a tank for the molten glass, a rotatable gathering disk having a portion extending into the tank below the normal level of the molten glass therein, means for rotating the disk, and means adjustable toward and away from the periphery of the disk for removing the glass gathered thereon.

2. In apparatus for gathering and delivering molten glass, a tank for the molten glass, a rotatable gathering disk having a portion extending into the tank below the normal level of the molten glass, means for rotating the disk, and an inclined trough adjustable relative to the periphery of the disk to engage the upper end thereof with the glass gathered by the disk and effect its removal into the trough.

3. In apparatus for gathering and delivering molten glass, a tank for the molten glass, a rotatable gathering disk having a portion extending into the tank below the normal level of the molten glass, means for rotating the disk, a guide-way, a standard having its lower end adjustably supported by the guideway, an inclined trough fixed to the upper end of the standard, and means for adjusting the standard to engage the upper end of the trough with the glass gathered by the disk and thereby effect its removal into the trough during rotation of the disk.

4. In apparatus for gathering and delivering molten glass, a main tank, an auxiliary tank, a rotatable gathering disk having a portion extending into said main tank below the normal level of the molten glass, means for rotating the disk, means for transferring glass gathered by the disk to the auxiliary tank, and means for automatically delivering glass from the auxiliary tank to a glass working apparatus.

5. In apparatus for gathering and delivering molten glass, a main tank, an auxiliary tank, a rotatable gathering disk having a portion extending into said main tank below the normal level of the molten glass, means for rotating the disk, an inclined trough having its lower end positioned to deliver to the auxiliary tank and its upper end positioned to engage the glass gathered by the disk and thereby effect its removal into the trough for conveyance to the auxiliary tank, and means for delivering glass from the auxiliary tank to a glass working apparatus.

6. In apparatus for gathering and delivering molten glass, a main tank, an auxiliary tank, a rotatable gathering disk having a portion extending into said main tank below the normal level of the molten glass, means for rotating the disk, an inclined trough having its lower end positioned to deliver to the auxiliary tank and its upper end positioned to effect removal of the glass gathered on the disk into the trough for conveyance to the auxiliary tank, means for adjusting the trough to vary the position of its upper end with respect to the disk, and means for delivering glass from the auxiliary tank to a glass working apparatus.

7. In apparatus for gathering and delivering molten glass, a main tank, an auxiliary tank, a rotatable gathering disk having a portion extending into said main tank below the normal level of the molten glass, means for rotating the disk, an inclined trough having its lower end positioned to deliver to the auxiliary tank and its upper end positioned to effect removal of the glass gathered on the disk into the trough for conveyance to the auxiliary tank, means for heating the interior of the auxiliary tank, an extension on the auxiliary tank above and parallel to the trough whereby the hot gas from the auxiliary tank will pass over and heat the glass being conveyed by the trough, and means for delivering glass from the auxiliary tank to a glass working apparatus.

In testimony whereof I hereunto affix my signature.

ALLEN CHARLES WILCOX.